Oct. 4, 1949.　　　　　A. J. LE BLANC　　　　　2,483,649
CULTIVATOR
Filed Nov. 6, 1945　　　　　　　　　　　　　3 Sheets-Sheet 3

Inventor
Adam J. Le Blanc
By Mason & Hatfield
Attorneys

Patented Oct. 4, 1949

2,483,649

UNITED STATES PATENT OFFICE 2,483,649

CULTIVATOR

Adam J. Le Blanc, Donaldsonville, La., assignor to Le Blanc Hardware Co., Inc., Parish of Ascension, La., a corporation of Louisiana Application November 6, 1945, Serial No. 627,017

6 Claims. (Cl. 97—50)

The present invention relates to an improved multiple gang cultivator and frame assembly of the type adapted to be attached to and supported from a tractor or the like.

It is a principal object of this invention to provide an improved type of tractor-carried multiple gang cultivator assembly having sub-frame assemblies for adjustably supporting various individual ones of the plurality of gang units together with manually operable means for horizontally shifting selected ones of the individual sub-frame supported gang units relative to each other such that the width spacing between any of the gang units may be varied to accommodate various spacing widths between the rows of earth being cultivated.

It is also an object of this invention to provide for power operable adjusting means to vertically raise or lower the gang units adjustably supported on the sub-frame assembly previously referred to, the power operable means also including automatic compensation devices to maintain the adjusted vertical position of the gangs when the horizontal position or spacing of the gangs is manually changed by the manual shifting means.

Further objects and advantages will be apparent by reference to the following specification and drawings in which.

Figure 1:
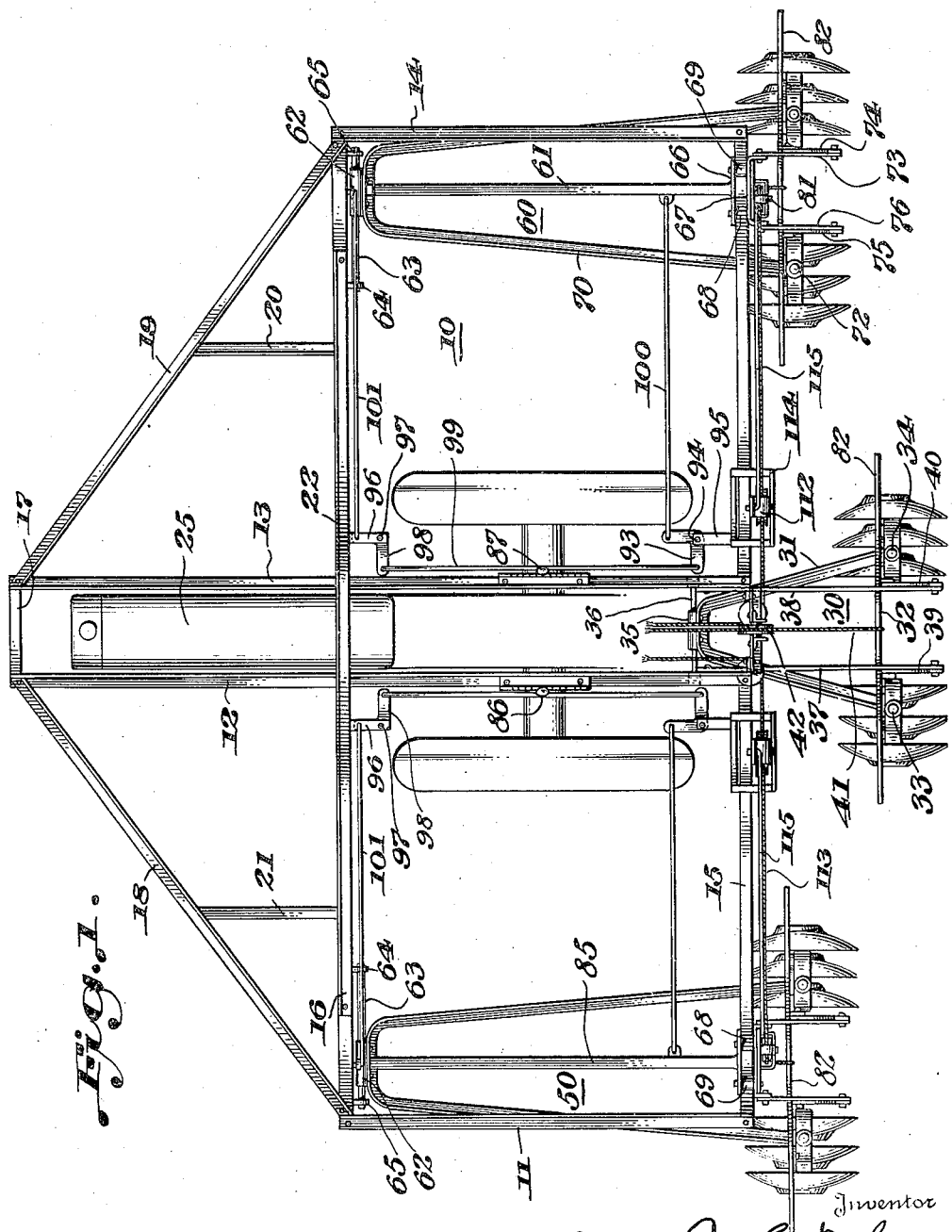
Figure 1 is a top plan view of the cultivator assembly of my invention.

Referring to the drawings it will be seen that the cultivator assembly generally comprises a main frame 10 which may be fabricated from angle irons or the like, the main frame 10 including the longitudinal members 11, 12, 13 and 14, the cross members 15, 16 and 17, the bracing members 18, 19, 20 and 21 and the top bracing member 22 all connected together in the manner shown to provide a tractor-carried supporting frame assembly for the cultivator gang units. The outlines of a tractor 25 is shown in the frame space between the longitudinal members 12 and 13 to show the general manner in which the cultivator assembly is supported or carried by the tractor.

In the specific embodiment being described, a three gang unit type of multiple gang cultivator is disclosed, each gang unit being comprised of two gangs of cultivator disks. It should be understood that the principles of this invention to be described may be used with a cultivator assembly having any number of relatively adjustable gang units and that the gang units may comprise any number of ganged cultivating devices.

With reference to the three gang unit cultivator assembly shown in the drawings, the middle gang unit 30 is comprised of the wishbone frame 31 and U-shaped cross member 32. Adjustably mounted to the ends of the cross member 32 in conventional manner are the cultivator gangs 33 and 34. The wishbone frame 31 is pivotally connected at 35 to the rod 36 fastened at each end to the longitudinal frame members 12 and 13 respectively. Pivotally connected brace or alignment members 37, 38, 39 and 40 are connected between the rear ends of the frame members 12 and 13 and the gang unit cross member 32 to re-enforce the gang unit 30 and pivot connection 35 against lateral twisting or movement during a cultivating operation while permitting, if desired, a vertical adjusting movement about the pivot 35. A cable 41 connected at one end to the cross member 32 and passing over a pulley 42 to the tractor power take-off drum, not shown, is employed as a power operable means to vertically raise or lower the gang unit when desired.

It will be noted that the middle gang unit 30 just described is not attached to the frame 10 in a manner to permit a lateral or horizontal adjustment of its position relative to the frame 10. According to my invention the two outer gang units 50 and 60 are connected to the frame in a manner to permit both a vertical raising or lowering movement of the gang units and a horizontal or lateral movement of the gang units 50 and 60 relative to the frame 10 and the middle gang unit 30.

Since the gang units 50 and 60 and the means for attaching them to the frame 10 are identical a description will be made only with reference to gang unit 60.

A horizontally movable sub-frame member 61 is carried at one end by the slide bearing 62 on the slide rod 63 which is fixed at each end to the projections 64 and 65 of the cross frame member 16. The other end of the sub-frame member 61 is provided with the cross members 66 and 67 between which are rotatably supported the rollers 68 and 69 engaging the top surface of the cross frame members 15. Thus the sub-frame member 61 is carried by the frame 10 and is permitted a limited horizontal adjustment or movement relative to the frame 10 along the slide rod 63 between the projections 64 and 65. Also, pivotally connected for vertical movement at 62 to the sub-frame 61 is the wishbone frame 70 across the open ends of which is fastened the U-shaped cross member 71 to the ends of which the cultivator gangs 72 and 73 are fastened as previously described in connection with the gang unit 30. The pivotally connected brace or alignment members 73, 74, 75 and 76 are connected between the cross member 71 of the wishbone frame 70 and the cross member 67 of sub-frame 61 to maintain alignment of the cultivator units with the sub-frame 61 and hence the main frame 10, as should be readily apparent. The gang unit is raised or lowered by the cable 80 passing over the pulley 81 on the cross member 67 to the power take-off of the tractor.

My invention provides for individual manual means for horizontally or laterally moving the gang units 50 and 60 and their sub-frames relative to the main frame and gang unit 30. Each movable sub-frame and gang unit 61 and 85 is provided with an operating handle 86 and 87, respectively, mounted to the main frame longitudinal members 12 and 13 at a position handy to the tractor operator. As the individual moving means are identical only one will be described in detail in connection with the movable gang unit 60. The handle 87 is pivoted at 90 to the frame member 13 and is provided with a conventional form of latch mechanism 91 for locking the handle at the desired position. A connecting rod 92 is connected between the handle 87 and a bell crank 93 in such manner that movement of the handle causes a corresponding movement of the bell crank 93 about its pivot 94. The pivot point 94 is on a member 95 fixed to the frame member 15. The frame member 16 is also provided with a fixed member 96 to which is pivoted at 97 a bell crank 98 identical with bell crank 93. Bell cranks 93 and 98 are connected together by the connecting rod 99 so that movement of handle 87 causes simultaneous movement of bell cranks 93 and 98. The sub-frame 61 is connected to the bell cranks 93 and 98 by the connecting rods 100 and 101 respectively and the entire mechanism forms a parallel lever system such that movement of the handle 87 causes a corresponding horizontal or lateral movement of the sub-frame 61 relative to the main frame 10.

Figure 2:
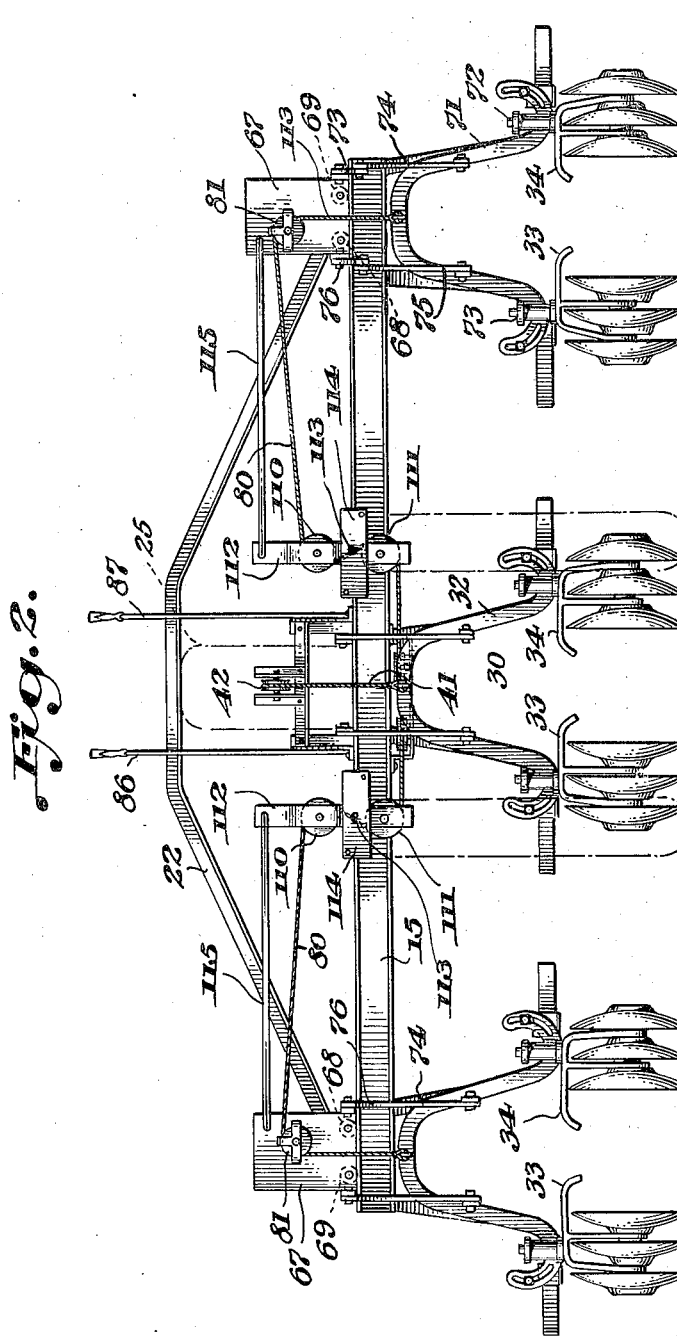
Figure 2 is a rear elevation showing in detail the automatic compensation devices.
Figure 3:
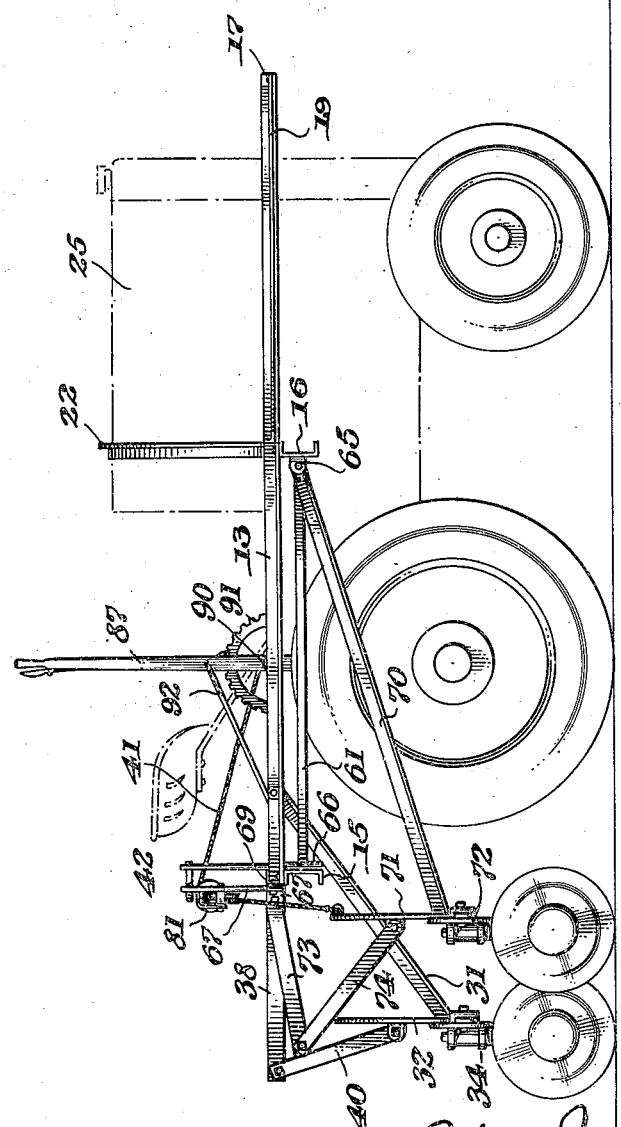
Figure 3 is a side view.

As previously described, the gang units 50 and 60 are vertically raised or lowered by cables passing over pulleys supported by the rear cross member of the movable sub-frame to the power take-off of the tractor. It should be obvious that a lateral or horizontal movement of the sub-frame 61 would cause a change in the adjusted vertical position of the cultivator gangs unless automatic means to compensate for the change in distance from the cable end to the power take-off is used. My invention proposes the following described automatically compensating or slack adjusting means for the cable length to the cable distance. With particular reference to Figures 1 and 2 of the drawings, it will be seen that the cable 80 passes over the pulley 81 to the pulleys 110 and 111 which are rotatably supported on the member 112. From the pulley 111 the cable passes through suitable additional pulleys to the power take-off drum (not shown) of the tractor. The member 12 is pivotally supported at 113 to a box-like member 114 which is fixed to the frame cross member 15. The upper end of the member 112 is connected to the cross member 67 of the movable sub-frame 61 by the connecting rod 115 so that a horizontal or lateral movement of the sub-frame 61 causes a corresponding pivotal or rocking movement of the member 112 about its pivot 113 to the main frame member 15. With the cable 80 passing around the pulleys 110 and 111 in the manner shown it will be seen that the change in distance from the cable end to the power take off upon horizontal or lateral movement of the sub-frame is automatically compensated for so as to maintain the adjusted vertical position of the cultivator gangs.

It will be noted from an inspection of the drawings and the above description that this invention requires no operator for each individual unit to maintain alignment of cultivator units with sub-frame 61. The mechanism for maintaining alignment of the cultivator units is designated by parts 73, 74, 75 and 76.

I have described as my invention a multiple gang cultivator and frame assembly having manual means for horizontally moving a selected gang unit relative to another gang unit together with power operable means for raising or lowering the gang units, the power operable means including automatic compensation devices connected with the manual moving means to maintain the adjusted vertical position of the cultivator gangs when a gang unit is horizontally moved. It should be understood that the description has referred to a preferred embodiment only and that the invention is capable of any modification within the scope of the appended claims.

I claim:

1. A tractor carried multiple gang cultivator assembly comprising a main frame adapted to be supported from a tractor, a multiple gang unit pivotally connected for vertical adjustment to said main frame, sub-frames carried and supported by said main frame, a multiple gang unit pivotally connected for vertical movement to each of said sub-frames, means including a cable operated by the motor of said tractor for vertically moving said multiple gang units to vertically adjust said gang units, means including a lever system for horizontally moving each sub-frame and its associated gang unit, and means for automatically compensating said cable to maintain the adjusted vertical position of said horizontally movable gang units when said lever system for each sub-frame is operated, said last named means including a pivoted member mounted on said frame and a horizontally disposed link pivotally connecting said pivoted member to one of said sub-frames.

2. A tractor carried multiple gang cultivator assembly comprising a main frame adapted to be supported from a tractor, a multiple gang unit pivotally connected for vertical movement to said main frame, sub-frames carried and supported by said main frame, a multiple gang unit pivotally connected for vertical movement to each of said sub-frames, means including a cable operated by the motor of said tractor for vertically moving said multiple gang units, means including a lever system for horizontally moving each sub-frame and its associated gang unit, means including a member pivotally connected to said main frame and a link connecting a sub-frame and said member for automatically compensating said cable to maintain the adjusted vertical position of one of said horizontally movable gang units when said lever system for each sub-frame is operated.

3. A tractor carried multiple gang cultivator assembly comprising a main frame adapted to be supported from a tractor, a multiple gang unit pivotally connected for vertical movement to said main frame, sub-frames carried and supported by said main frame, a multiple gang unit pivotally connected for vertical movement to each of said sub-frames, means including a cable operated by the motor of said tractor for vertically moving said multiple gang units, means including a lever system for horizontally moving each sub-frame and its associated gang unit, a plurality of pulleys over which said cable passes rotatably supported on a member pivotally connected to said main frame, said member providing means for automatically compensating said cable to maintain the adjusted vertical position of said horizontally movable gang units when said lever system for each sub-frame is operated.

4. A tractor carried multiple gang cultivator assembly comprising a main frame adapted to be supported from a tractor, a multiple gang unit pivotally connected for vertical movement to said main frame, sub-frames carried and supported by said main frame, a multiple gang unit pivotally connected for vertical movement to each of said sub-frames, means including a cable operated by the motor of said tractor for vertically moving said multiple gang units, means including a lever system for horizontally moving each sub-frame and its associated gang unit, interconnected alignment members pivotally connected to said main frame and to said gangs to enjoin lateral movement of the gang unit connected to said main frame, and means for automatically compensating said cable to maintain the adjusted vertical position of said horizontally movable gang units when said lever system for each sub-frame is operated.

5. A tractor carried multiple gang cultivator assembly comprising a main frame adapted to be supported from a tractor, a multiple gang unit pivotally connected for vertical movement to said main frame, sub-frames carried and supported by said main frame, a multiple gang unit pivotally connected for vertical movement to each of said sub-frames, means including a cable operated by the motor of said tractor for vertically moving said multiple gang units, means including a lever system for horizontally moving each sub-frame and its associated gang unit, alignment members pivotally connected to said main frame to enjoin lateral movement of the gang unit connected to said main frame, link means pivotally connected to each of said sub-frames and to said gangs, to maintain alignment of said sub-frame gang unit with the sub-frame and the main frame, and means for automatically compensating said cable to maintain the adjusted vertical position of said horizontally movable gang units when said lever system for each sub-frame is operated.

6. A tractor carried multiple gang cultivator assembly comprising a main frame adapted to be supported from a tractor, a multiple gang unit pivotally connected for vertical movement to said main frame, sub-frames carried and supported by said main frame, a multiple gang unit pivotally connected for vertical movement to each of said sub-frames, means including a cable operated by the motor of said tractor for vertically moving said multiple gang units, means including a lever system for horizontally moving each sub-frame and its associated gang unit, alignment members pivotally connected to said main frame to enjoin lateral movement of the gang unit connected to said main frame, link means pivotally connected to each of said sub-frames to maintain alignment of said sub-frame gang unit with the sub-frame and the main frame, a plurality of pulleys over which said cable passes rotatably supported on a member pivotally connected to said main frame, said member providing a means for automatically compensating said cable to maintain the adjusted vertical position of said horizontally movable gang units when said lever system for each sub-frame is operated.

ADAM J. LE BLANC.

REFERENCES CITED

The following references are of record in the file of this patent:

UNITED STATES PATENTS

| Number | Name | Date |
| --- | --- | --- |
| 224,639 | Brannan | Feb. 17, 1880 |
| 347,583 | Eddington | Aug. 17, 1886 |
| 744,753 | Hamilton | Nov. 24, 1903 |
| 774,817 | Bailor et al. | Nov. 15, 1904 |
| 1,105,450 | Owens | July 28, 1914 |
| 1,137,935 | Waterman | May 4, 1915 |
| 1,184,707 | Adams | May 30, 1916 |
| 1,265,776 | Harper | May 14, 1918 |
| 1,265,962 | Samuelson | May 14, 1918 |
| 1,541,955 | Hollenbeck | June 16, 1925 |
| 1,589,278 | Williams | June 15, 1926 |
| 1,894,516 | Karstedt | Jan. 17, 1933 |
| 1,902,689 | Charlesworth | Mar. 21, 1933 |
| 2,341,181 | Johnson | Feb. 8, 1944 |
| 2,351,078 | Silver | June 13, 1944 |